J. DAVIS.
Corn Sheller.
No. 52,690. Patented Feb. 20, 1866.
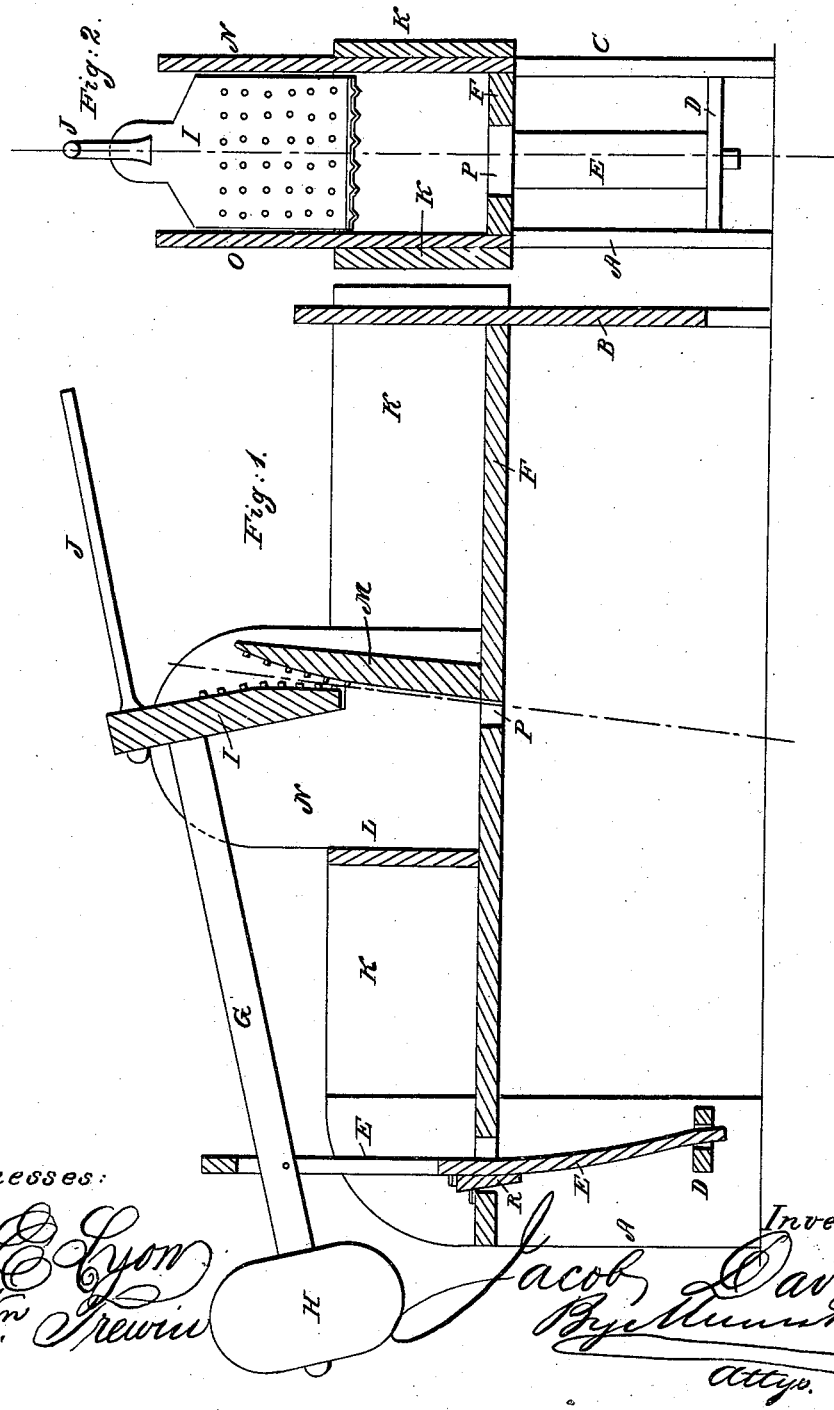

UNITED STATES PATENT OFFICE.

JACOB DAVIS, OF OAKS, WISCONSIN.

IMPROVEMENT IN CORN-SHELLERS.

Specification forming part of Letters Patent No. 52,690, dated February 20, 1866.

*To all whom it may concern:*

Be it known that I, JACOB DAVIS, of Oaks, in the county of Sauk and State of Wisconsin, have invented a new and useful Improvement in Corn-Shellers; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved corn-sheller through the line $x$ $x$, Fig. 2. Fig. 2 is a cross-section of the same through the line $y$ $y$, Fig. 1.

Similar letters of reference indicate like parts.

The object of my invention is to furnish a simple and durable machine for shelling corn, and one which will at the same time do its work as rapidly as any other hand-machine; and it consists in a machine by which the corn is shelled from the cob by rolling the ear between a pair of jaws, as hereinafter more fully described.

A, B, and C are the uprights which support the machine and to which the other parts are attached. D is a cross-piece placed between the uprights A and C, and to which the spring E is pivoted. The spring E is pivoted to the cross-piece D, passes up through a square hole in the bottom F, and has its upper part slotted for the reception of the bar G. The bar G is pivoted to the spring E through a slot, in which it passes, and has a balancing-weight, H, on its free end. To the forward end of the bar G is attached a jaw or block, I, the rear side of which is straight, but the front side is curved, as represented in the drawings. To the upper part of the front of the block or jaw I is attached an arm or handle, J, by which the machine is operated. The curved front side of the said jaw or block is furnished with teeth or cogs, as shown, and upon its lower edge is placed a strip of stiff leather, its front edge, which projects in front of the surface of said curved side, being serrated, as shown.

K are the side boards of the machine, which are attached to the bottom F and the uprights A B C.

L is a partition placed in the box and forming the front end of the shelling-box. The back or rear end of the shelling-box is formed by a block or jaw, M, the inner side of which is curved, as shown in Fig. 1, and also furnished with teeth or cogs. The sides of the shelling-box are formed by two uprights, N and O, which also serve as guides to the jaw I when the machine is operated. In the rear of the jaw or block M is the cob-box for the reception of the cobs from which the corn has been shelled.

When the machine is operated the jaw I is raised into the position shown in the drawings by means of the handle J. The ear of corn is then dropped into the angle between the jaws I and M. Then, by a quick downward stroke, the corn is shelled from the cob and falls through the hole P in a receptacle placed beneath the machine. Then the jaw I is again raised, the cob being rolled up between the jaws until finally it is raised by the leather on the bottom of the jaw I and falls into the cob-box. Sometimes a second stroke may be necessary to complete the shelling of the corn.

The pressure of the jaw I upon the ears may be regulated and the machine set for shelling large or small ears by means of the wedge R, placed between the back of the spring E and the side of the hole in the bottom board, F, through which the said spring passes.

I claim as new and desire to secure by Letters Patent—

A corn-sheller formed by combining the jaws I and M, the bar G, and the spring E with each other and with the box and frame in which they are placed, substantially as described, and for the purpose set forth.

JACOB DAVIS.

Witnesses:
 WM. H. DAVIS,
 ALONZO MCKOON.